United States Patent [19]

Inoue et al.

[11] Patent Number: 5,728,463
[45] Date of Patent: Mar. 17, 1998

[54] STATIONARY PHASE MATERIAL FOR CHROMATOGRAPHY

[75] Inventors: Senya Inoue; Nobuyuki Otaki, both of Soka, Japan

[73] Assignee: Kanto Kagaku Kabushiki Kaisha, Tokyo, Japan

[21] Appl. No.: 626,267

[22] Filed: Apr. 1, 1996

Related U.S. Application Data

[63] Continuation of Ser. No. 204,414, filed as PCT/JP93/01109 Aug. 6, 1993 published as WO94/03801 Feb. 17, 1994, abandoned.

[30] Foreign Application Priority Data

Aug. 7, 1992 [JP] Japan ................................ 4-251819

[51] Int. Cl.⁶ .................................................. B32B 5/16
[52] U.S. Cl. .................... 428/402; 210/502.1; 210/503; 210/506; 423/314; 428/403
[58] Field of Search .............................. 428/402, 403; 423/305, 314; 424/490, 601, 603, 604, 606; 210/500.1, 502.1, 503, 506

[56] References Cited

U.S. PATENT DOCUMENTS

| | | | |
|---|---|---|---|
| 3,652,334 | 3/1972 | Abeck et al. | 117/236 |
| 4,053,325 | 10/1977 | Vanderheiden | 106/304 |
| 4,609,484 | 9/1986 | Alberti et al. | 252/184 |
| 4,678,662 | 7/1987 | Chan | 424/57 |
| 4,874,520 | 10/1989 | Lee | 210/635 |
| 4,933,159 | 6/1990 | Nowack et al. | 423/245.1 |
| 5,011,679 | 4/1991 | Spanier et al. | 424/57 |
| 5,015,485 | 5/1991 | Scaglione et al. | 426/94 |
| 5,248,557 | 9/1993 | Jacobson | 428/404 |

FOREIGN PATENT DOCUMENTS

| | | |
|---|---|---|
| 0331283 | 9/1989 | European Pat. Off. . |
| 0252472 B1 | 10/1990 | European Pat. Off. . |
| 60-143762 | 7/1985 | Japan . |
| 63-16046 | 1/1988 | Japan . |
| 1-234308 | 9/1989 | Japan . |
| 8706492 | 11/1987 | WIPO . |

OTHER PUBLICATIONS

Analyst, vol. 117, No. 7, Jul. 1992 (Eng.), pp. 1133–1136.
G. C. Schito and A. Pesce, Giornale di Microbiologia, 13, 31–43 (1965).

*Primary Examiner*—H. Thi Le
*Attorney, Agent, or Firm*—Birch, Stewart, Kolasch & Birch, LLP

[57] ABSTRACT

A material for use as a stationary phase for chromatography comprising a solid material the surface of which is coated with pyrophosphate and/or metaphosphate.

15 Claims, 4 Drawing Sheets

STATIONARY PHASE MATERIAL FOR CHROMATOGRAPHY

This application is a continuation of application Ser. No. 08/204,414, filed as PCT/JP93/01109, Aug. 6, 1993, published as WO94/03801, Feb. 17, 1994, now abandoned.

FIELD OF INDUSTRIAL APPLICATION

The present invention relates to a stationary phase material for chromatography.

BACKGROUND ART

Stationary phase materials for chromatography have conventionally been prepared from silica gel, chemically modified silica gel, organic polymer etc. Hydroxyapatite in particular has recently been used as adsorbent for biochromatography, due to its excellent biocompatibility as well as to its outstanding capability of separating and purifying biopolymers, such as proteins or nucleic acids, under mild conditions. In the field of biotechnology, chromatography has now been recognized to be useful, and in fact has been increasingly utilized, as means for separating and purifying substances of use from biomolecules containing different contaminants. Existing stationary phase materials for chromatography, however, are not perfect enough to satisfy all the properties required for means for separating and purifying specific substances from biomolecules containing complex component substances. For example, where biomolecules containing monoclonal antibodies are handled, in which proteins such as albumin and transferrin are normally present together, it is not easy to carry out their separation in simple operations using conventional means. In such cases where separation and purification of biomolecules cannot easily be made due to the complexities involved in separation and purification operations, the development of novel stationary phase materials for chromatography has been keenly desired, which materials make it possible to perform mass separation and purification simply, rapidly and hence at a low cost.

OBJECTS OF THE INVENTION

The object of the present invention is, in view of the state of the art as described above, to provide a stationary phase material for chromatography having suitable properties for the separation and purification of particular substances from biomolecules such as proteins, enzymes, nucleic acids and saccharides.

Another object of the present invention is to provide a chromatography device which includes a chromatography column and a stationary phase material for chromatography having: (1) particles formed of metal pyrophosphate, metal metaphosphate or a combination thereof; and (2) particles having a substrate and a coating on the surface of the substrate, wherein the substrate is a solid particulate material selected from the group consisting of glass, metal, resin, metal pyrophosphate and metal metaphosphate particles and wherein the coating comprises metal pyrophosphate, metal metaphosphate or a combination thereof.

In the state of the art, solid materials the surface of which is coated with pyrophosphate and/or metaphosphate have not been known at all as stationary phase materials for chromatography. It has previously been reported to utilize a pyrophosphate gel for chromatography [G. C. Schito and A. Pesce, Giornale di Microbiologia, 13, 31–43 (1965)]. The magnesium pyrophosphate gel used therein, however, has the following, disadvantages; with the lapse of time after preparation of the gel there occur changes in its physical properties, e.g. a decrease in particle size due to a change in the state of hydration. For example, the lapse of several weeks will result in particle size reduction to such an extent that the particles will pass through the sintered glass filter of the chromatographic column, which necessitates the use of the gel immediately after its preparation. In addition, when directly packed into a column, such a gel will give rise to high resistance upon elution with buffers and therefore is needed to be used in admixture with Sephadex (Pharmacia; a packing material for gel filtration). Thus, due to the problems with respect to physicochemical stability as a material for chromatography, the means of using such a gel has not been widely put to industrial application in practice.

DISCLOSURE OF THE INVENTION

In accordance with the present invention, there is provided a novel stationary phase material for chromatography which meets the object as described above.

The novel material of the present invention is characterized by comprising a solid material the surface of which is coated with pyrophosphate and/or metaphosphate.

In the following will now be described the present invention in detail.

As solid carrier materials for use as the substrate of the stationary phase material for chromatography according to the present invention, there may be used a wide variety of materials such as glass, ceramics, metals and resins. Where such solid carrier materials are to be used, the surface thereof will be coated with pyrophosphate or metaphosphate. Alternatively, pyrophosphate or metaphosphate as such may be used as the solid phase carrier material. In this case, the surface of the stationary phase material consists of such phosphate as a matter of course since the whole of the stationary phase material is composed of that phosphate. Accordingly, the stationary phase material for chromatography according to the present invention may take, roughly, the following two forms:

1) Stationary phase material wherein a solid material consisting of a material different from pyrophosphate or metaphosphate is used and its surface is coated with pyrophosphate and/or metaphosphate;

2) Stationary phase material consisting entirely of pyrophosphate or metaphosphate.

The pyrophosphate or metaphosphate to be used in the present invention may be in the form of a solid composed of crystallites grown to such an extent that diffraction peaks can be observed by X-ray diffraction analysis (i.e. crystalline solid) or in the form of a solid composed of fine crystallites such that no apparent diffraction peaks can be observed by X-ray diffraction analysis (i.e. noncrystalline solid). Thus, the size of crystallites constituting such phosphate is by no means limited in any way. Such phosphate is to be understood to mean any solid phosphate capable of forming a physicochemically stable coating layer. Accordingly, physicochemically unstable pyrophosphate or metaphosphate gels do not fall within the meaning of the stationary phase material phosphate in accordance with the present invention.

As the component metal of the pyrophosphate which constitutes the surface coating of the stationary phase material for chromatography according to the present invention, there may be used a metal selected from a variety of metals including alkaline earth metals, iron family metals, magnesium, manganese, copper, zinc and zirconium. In particular, the use of calcium or magnesium is extremely preferred due to its excellent performance as stationary phase material for chromatography on biomolecules. The component metal in the phosphate may be present in combination of two or more of the metallic elements described above. Thus, for example, there may be used without any inconvenience phosphate materials having $CaMgP_2O_7$, $Ca_{1.5}Sr_{0.5}P_2O_7$ or the like composition as well as those materials the composition of which is such that the component metal content is derogated, in respect of charge or number of atoms, from that in phosphate materials having the stoichiometric composition, e.g. $Ca_{1.5}Mg_{0.4}P_2O_7$ or $Ca_{2.05}P_2O_7$, if only diffraction peaks of pyrophosphate are observed by X-ray diffraction analysis or if, even where biproduct peaks are observed by X-ray diffraction analysis in addition to the peaks of the main product pyrophosphate, the phosphate is substantially pyrophosphate. Accordingly, pyrophosphate having a nonstoichiometric composition also should be understood to fall within the term "pyrophosphate" as used herein.

The combination of component metals may be varied with respect to the kind and/or proportion of the components, so that the interaction of the phosphate with the biomolecule(s) to be applied to chromatography may be suitably adjusted.

In the present invention, where the pyrophosphate or metaphosphate is crystalline, it is understood to mean hydrated or nonhydrated pyrophosphate or metaphosphate which is a solid in the crystal state of single crystal or polycrystal, the crystallites of the solid having being grown to a size such that the substance identification can be made on the basis of diffraction peaks from X-ray diffraction analysis, or to a larger size than such a size. With regard to the crystal structure of such phosphate, there exist varied pyrophosphate and metaphosphate having many different crystal structures. In the case of calcium pyrophosphate, for example, four and three different kinds of crystal structure exist for the hydrated and the nonhydrated calcium pyrophosphate, respectively. The present inventors have also found that the interacting force between pyrophosphate or metaphosphate and biomolecules vary with such differences in crystal structure as described above. By means of combining, while taking advantage of Such variation, different kinds of pyrophosphate and/or metaphosphate having different crystal states or structures, various aspects of performance can be adjusted.

In the case of pyrophosphate or metaphosphate gels, extremely fine particles of such phosphate in colloidal dispersion aggregate together to form a three-dimensional framework with many spaces therein, and liquid is incorporated into the very fine capillaries between the particles as well as into the very small spaces in the framework to form a solid-liquid gel, so that swelling and shrinkage take place due to the influx and efflux of the liquid in these capillaries or spaces. In contrast to these phosphate gels, the crystalline pyrophosphate and metaphosphate are stable, both physically and chemically, causing no swelling or shrinkage upon drying. Accordingly, they have the advantageous properties that they can easily be stored in the atmosphere for a long period without changes with time, and also that they, being a crystalline solid, possess high mechanical strength so that possible troubles upon their packing into a column, such as an increase in back pressure due to compression, can be avoided.

Even in the case of noncrystalline pyrophosphate and metaphosphate, such phosphate in which the particles are firmly bound together to give high mechanical strength can stably be used as a stationary phase material in the same manner as in the case of the above mentioned crystalline phosphate. Thus, for example, a zirconium pyrophosphate-based noncrystalline solid obtained by reacting zirconium oxynitrate with phosphoric acid to give a precipitate, drying the precipitate and subjecting the dried precipitate to heat treatment at 800° C. can be stably used, even when repeatedly employed, as a stationary phase material for chromatography.

In coating the surface of solid materials with the above mentioned pyrophosphate, the coating method and the state of coatings are not limited in any particular way, whether the binding between the pyrophosphate and the solid carrier is chemical or physical in nature, so long as the pyrophosphate covering the surface of the solid carrier material functions as stationary phase for chromatography. Thus, for example, the surface of a solid carrier material may be filmwise coated with pyrophosphate to form a layer of a given thickness, or fine particles of pyrophosphate may be bound onto the surface of a solid carrier material by layering the latter with the former. These layers and bound fine particles may take a variety of states, ranging from dense and pore-free to porous, and any such state may be chosen, depending upon the purpose of the chromatography. Thus, for example, where the carrier used is physicochemically so stable under the operating conditions for the chromatography as to cause no adverse interaction with the buffer or sample, or where the pyrophosphate as such is used as the solid carrier, it is not necessarily required to coat the surface of the solid carrier material densely with a pyrophosphate layer. It is effective for enhancing the sample-loading capacity that the surface of the solid carrier is made porous with pyrophosphate particles coarsely bound in such a manner as not to cause any inconvenience to chromatography, because the specific surface area of the pyrophosphate becomes larger.

Stationary phase materials consisting entirely of pyrophosphate may be used. For their preparation, for example, the hydrogen phosphate or ammonium phosphate of such as alkaline earth metal, magnesium or manganese or the like may be subjected to pyrolysis to give crystalline nonhydrated pyrophosphate, or an aqueous solution of calcium acetate and an aqueous solution of calcium dihydrogen diphosphate may be mixed together and then allowed to stand to give calcium pyrophosphate tetrahydrate. In either case, there is obtained a stationary phase material consisting of pyrophosphate in which the solid carrier material and the coating layer are integrated together. It is also possible to prepare a stationary phase material in which the state of the pyrophosphate constituting the carrier portion is different from that of the pyrophosphate constituting the surface layer, in order to render even higher the mechanical strength of the pyrophosphate used as the stationary phase material and also in order to enhance sample-loading capacity. For this purpose, the solid carrier material pyrophosphate having previously been formed into spheres in a known manner such as by spray drying is sufficiently fired at an elevated temperature to produce particles of high mechanical strength, the surface of which is then coarsely coated with and bound to separately prepared fine pyrophosphate particles of different sizes. For preparing a stationary phase material in which a material other than pyrophosphate is used as the solid carrier material with its surface coated with pyrophosphate, any of a variety of methods may be employed. Thus, for example, in one such method, a slurry of pyrophosphate is sprayed onto the surface of a carrier material and then dried by heating. In another such method, a carrier material is dipped in a solution or slurry of phosphoric acid and a metal compound and, after separation of the solution or slurry and subsequent drying, is heated to form a coating of the pyrophosphate on its surface.

Reference is now made to the above described metaphosphate.

What is meant by the term metaphosphate is not necessarily standardized. Metaphosphate has been classified in accordance with the component metal/phosphorus ratio based on the number of atoms (atomic ratio), or with whether the molecular structure is chain or ring structure. Therefore what is meant by the term metaphosphate used by researchers in papers published to date in scientific journals is not necessarily the same. The term metaphosphate is used herein to mean any condensed phosphate, whether the molecular structure is chain or ring structure, that is composed of metal ion M (charge number: m) and metaphosphate ion ($PO_3^-$) in a M to P atomic ratio (M/P) of 1/m. Thus, for example, where M is a monovalent metal, the concept of the phosphate as used in the present invention includes, not to speak of cyclic structures designated strictly as $(MPO_3)_n$ (n=3, 4, 5 etc.), long chain structures which have hitherto been customarily designated, aside from academic arguments, by the approximate formula $(MPO_3)_n$. (Although the latter structures, being chains, should be polyphosphate of $M_{n+2}PnO_{3n+1}$, they have been interpreted to be representable approximately by $M_{n+2}PnO_{3n+1} \approx M_nP_nO_{3n} = (MPO_3)_n$ because of the n being extremely large.) In another example, aluminum tetrametaphosphate is represented, in ASTM data collection or scientific papers, by $Al_4(P_4O_{12})_3$ or customarily by $Al(PO3)_3$. Any materials comprised essentially of metaphosphate ion ($PO_3^-$), irrespective of how they are represented, are understood to be included in the concept of the metaphosphate as used in the present invention.

As the component metal of the above mentioned metaphosphate, there may be used a metal selected from a variety of metals including magnesium, alkaline earth metals, manganese, iron family metals, copper, zinc, aluminum and zirconium. In particular, the use of aluminum, calcium or magnesium is extremely preferred due to its excellent performance as a stationary phase material for chromatography on biomolecules. The component metal in the metaphosphate may be present in combination of two or more of the component metals described above. The combination of component metals may be varied with respect to the kind and/or proportion of the components so that the interaction of the metaphosphate with the biomolecule(s) to be subjected to chromatography may be suitably adjusted.

The metaphosphate to be used in accordance with the present invention may be in any of the noncrystalline, glassy and crystalline states. In particular, the crystalline metaphosphate is more preferably used as a stationary phase material for chromatography because it has lower citrate solubility than the noncrystalline or glassy metaphosphate and hence higher chemical durability in liquids.

The metal ion/metaphosphate ion ($PO_3^-$) ratio in the metaphosphate mentioned above may not necessarily be stoichiometric. Furthermore, the metaphosphate need not be a material consisting solely of metaphosphate and may be a material which owes its function as stationary phase for chromatography substantially to the presence of metaphosphate therein and which is able to exist stably in the eluent used. Thus, it is to be understood that the "metaphosphate" as used in the present invention also includes metaphosphate having a composition slightly departing from the stoichiometric composition as well as metaphosphate contaminated with minor amounts of substances other than metaphosphate.

As is the case for example with aluminum tetrametaphosphate or calcium metaphosphate, the crystal structure of metaphosphate shows polymorphism, that is to say, there exist various kind of metaphosphate having different crystal structures. The present inventors have also found that the interacting force between the metaphosphate and the biomolecule(s) vary with differences in crystal structure. By means of combining, while taking advantage of such variation, different kinds of metaphosphate having different crystal states or structures, various aspects of performance as stationary phase material can be adjusted.

As for the molecular structure of metaphosphate, it may be chain or ring depending upon the manufacturing conditions used. Thus, for example, magnesium metaphosphate may occur in the form by $[Mg(PO_3)_2]_n$, i.e. magnesium metaphosphate having a long-chain structure, or $Mg_2P_4O_{12}$, i.e. magnesium tetrametaphosphate having a ring structure, depending upon the kind of the starting material, the preparation conditions, etc. It is to be understood that metaphosphate with any of these molecular structures is included in the "metaphosphate" as used in the present invention.

In coating the surface of solid materials with the above mentioned metaphosphate, the coating method and the state of coatings are not limited in any particular way, whether the binding between the metaphosphate and the solid carrier is chemical or physical in nature, so long as the metaphosphate covering the surface of the solid carrier material functions as stationary phase for chromatography. Thus, for example, the surface of a solid carrier material may be filmwise coated with metaphosphate to form a layer of a given thickness, or fine particles of metaphosphate may be bound onto the surface of a solid carrier material by layering the latter with the former. These layers and bound fine particles may take a variety of states, ranging from dense and pore-free to porous, and any such state may be chosen, depending upon the purpose of the chromatography. Thus, for example, where the carrier used is physicochemically so stable under the operating conditions for the chromatography as to cause no adverse interaction with the buffer or sample, or where the metaphosphate as such is used as the solid carrier, it is not necessarily required to coat the surface of the solid carrier material densely with metaphosphate layer. It is effective for enhancing the sample-loading capacity that the surface of the solid carrier is made porous with metaphosphate particles coarsely bound in such a manner as not to cause any inconvenience to chromatography, because the specific surface area of the metaphosphate becomes larger.

Stationary phase materials consisting solely of metaphosphate may be used. For their preparation, various known methods may be used. Thus, for example, a mixture of aluminum hydroxide and phosphoric acid is evaporated to dryness and then subjected to pyrolysis, or the dihydrogen phosphate of such a metal as an alkaline earth metal, magnesium and nickel is subjected to pyrolysis. There is thus obtained a stationary phase material consisting of metaphosphate in which the solid carrier material and the coating layer are integrated together. It is also possible to prepare a stationary phase material in which the state of the metaphosphate constituting the carrier portion is different from that of the metaphosphate constituting the surface layer, in order to render even higher the mechanical strength of the metaphosphate used as the stationary phase material and also in order to enhance sample-loading capacity. Thus, for this purpose, metaphosphate having previously been formed into spheres in a known manner such as by spray drying is sufficiently fired at an elevated temperature to produce particles of high mechanical strength, the surface of which is then coarsely coated with and bound to separately prepared fine metaphosphate particles of different sizes. For preparing a stationary phase material in which a material other than metaphosphate is used as the solid carrier material with its surface coated with metaphosphate, any of a variety of methods may be used. Thus, for example, in one such method, a slurry of metaphosphate is sprayed onto the surface of a carrier material and then dried by heating. In another such method, a carrier material in dipped in a solution or slurry of phosphoric acid and a metal compound and, after separation of the solution or slurry and subsequent drying, is heated to form a coating of the metaphosphate on its surface.

The stationary phase material for chromatography according to the present invention is not limited in any particular way with respect to its shape and size, and any shape of any size such as particles, fibers and membranes may be designed that will fit best the particular purpose of use. For use as an adsorbent for column chromatography or thin layer chromatography, any particulate material may be used, and in particular for use as a packing material for column chromatography the material is preferably spherical. To prepare such stationary phase materials, those which are porous and which have large specific surface areas as well as high loading capacity for proteins, nucleic acids etc. may be prepared by any known process such as spray drying and spray pyrolyzing, using a slurry of the above described pyrophosphate or metaphosphate or a slurry in which such a component as will be converted upon heating into such pyrophosphate or metaphosphate is incorporated.

The hydration state and crystal structure of pyrophosphate or metaphosphate may be altered by changing variously heat treatment conditions such as heating temperatures and times. By taking advantage of this, it is possible to prepare pyrophosphate or metaphosphate with controlled ability to interact with biomolecules such as proteins and nucleic acids. Thus, for example, if it is to be applied to acidic proteins, which are in principle weak in interaction with pyrophosphate or metaphosphate, the pyrophosphate or metaphosphate may be adjusted, with respect to its ability to interact with them, by changing heat treatment conditions in its preparation, in such a manner that the proteins will be retained, albeit extremely weakly, or will not be retained at all thereon.

The pyrophosphate or metaphosphate in the stationary phase material for chromatography of the present invention is excellent in physicochemical stability and easy to handle, and allows adsorbed biomolecules such as proteins and nucleic acids easily to be eluted under mild conditions, i.e. by gradient elution of phosphate anion concentration in normally neutral phosphate buffer, so that there occurs little denaturation in the sample applied thereto, a possible problem associated with the elution by reverse phase chromatography. As will be described below in detail in illustrative examples, phosphoproteins have been found to show too strong an interaction with hydroxyapatite but a moderate interaction with pyrophosphate or metaphosphate. The pyrophosphate or metaphosphate in the stationary phase material according to the present invention shows an ability of fractionating different proteins into the group of acidic proteins and that of basic proteins. Accordingly, the stationary phase material of the present invention exhibits a number of excellent properties in chromatography. Albumin and globulin are the two major serum proteins in the blood. The proportion of globulin present varies markedly in different diseases, and such variation is a subject of evaluation which is important both physiologically and medically. The stationary phase material according to the present invention shows excellent performance in the separation of such serum albumin and γ-globulin and hence is extremely useful as a medical material for blood purification.

When a pyrophosphate column is used to effect chromatography on acidic proteins which tend to be poorly retained, it often happens that the proteins fail to be retained to give no reproducible elution behavior unless the column conditioning time is taken sufficiently long. In contrast, chromatography using a metaphosphate column has the advantage that the column conditioning can be carried out rapidly. Thus, for example, on an aluminum metaphosphate column, chromatography can be reproducibly made even when the time for column conditioning is as short as 30 minutes or less. This leads for example to a shortened period of time required for performing chromatography as well as to a decrease in the amount of eluent used, which is quite favorable for enhancing productivity and attempting cost reduction. As is the case with pyrophosphate, metaphosphate has the advantage that the separation and purification therewith can be made under mild conditions using an eluent of approximately neutral pH. It also permits chromatography, if necessary, to be carried out using a strongly acidic or a strongly alkaline eluent. Thus, for example, when chromatography was repeatedly performed at pH 4 on a magnesium metaphosphate column, it was stable without causing any variation in retention time. Further, while very few kinds of pyrophosphate, such as magnesium pyrophosphate, show the property of poorly retaining particular phosphoproteins, quite a few kinds of metaphosphate including not only magnesium metaphosphate but also aluminum metaphosphate and calcium metaphosphate show poor retaining ability for a number of phosphoproteins such as phosvitin and casein.

The present invention will now be illustrated below by way of illustrative examples of the present invention and comparative examples. It is to be understood that the present invention be by no means limited to these examples.

EXAMPLE 1

Figure 1:
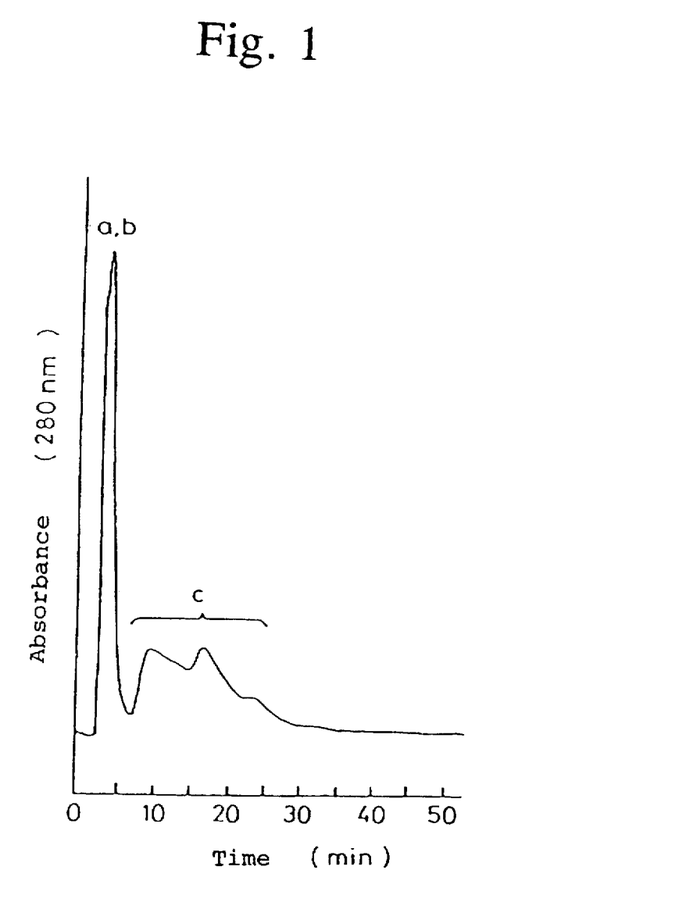
FIG. 1 shows the chromatogram obtained in Example 1 of a mixed sample of serum albumin, transferrin and γ-globulin, wherein the reference signs a, b and c represent the peaks of the serum albumin, transferrin and γ-globulin, respectively.

A slurry prepared by dispersing finely powdered magnesium ammonium phosphate hexahydrate in a mixed solution of water and methanol was subjected to spray pyrolyzing at 1,000° C. to afford spherical magnesium pyrophosphate having a particle size of 4–10 microns. The spherical magnesium pyrophosphate was packed into a stainless steel tube (8×100mm) and a mixed sample of serum albumin, transferrin and γ-globulin was subjected to chromatography thereon at a flow rate of 1 ml/min by a linear gradient in which the phosphate anion concentration in sodium phosphate buffer, pH 6–8, was changed over a 60 minutes from 10 mM to 300 mM. The back pressure at the time of measurement was a suitable pressure of as low as 4 kg/cm². The chromatogram thus obtained is shown in FIG. 1. As is apparent from FIG. 1, only the γ-globulin was retained in the column and the serum albumin and transferrin flowed through it without being retained therein. It was thus possible easily to separate the γ-globulin from the mixed sample.

Using the enzyme-linked immunosorbent assay (ELISA), each of the thus separated fractions was assayed for activity with the result that only the serum albumin activity and transferrin activity were detected in the flow-through fractions and only the γ-globulin activity in the fractions retained in the column. Further, antibody activity was also detected concurrently with the γ-globulin activity, which demonstrated that antibody activity was retained after the separation operations on the column.

COMPARATIVE EXAMPLE 1

Figure 2:
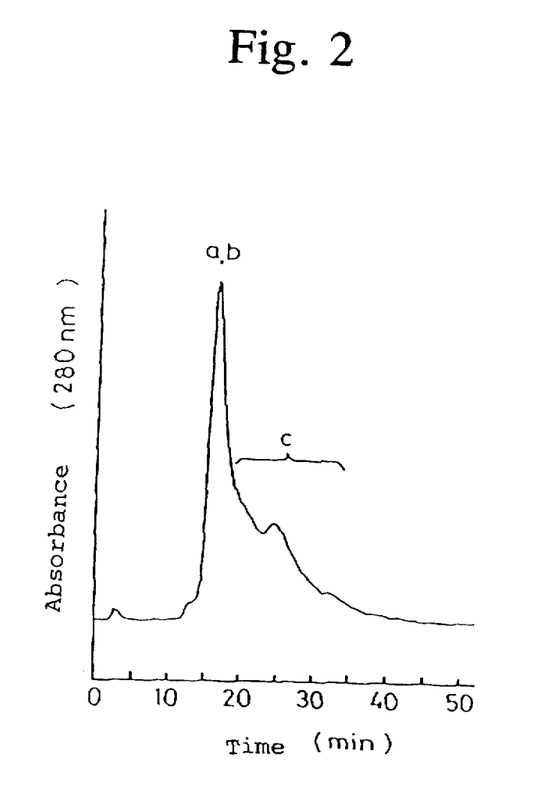
FIG. 2 shows the chromatogram obtained in Comparative Example 1 of a mixed sample of serum albumin, transferrin and γ-globulin, wherein the reference signs a, b and c represent the peaks of the serum albumin, transferrin and γ-globulin, respectively.

A commercially available spherical hydroxyapatite packing material was packed into a column in the same manner as in Example 1 and chromatography was carried out thereon in the same manner as in Example 1. The results are shown in FIG. 2. In the chromatogram were observed overlapping peaks of the three different components, i.e. serum albumin, transferrin and γ-globulin, in the sample applied to the hydroxyapatite.

COMPARATIVE EXAMPLE 2

In accordance with the procedure as described in G. C. Schito and A. Pesce, Giornale di Microbiologia, 13, 31–43 (1965), a sodium pyrophosphate solution was gradually added to a stirred magnesium chloride solution to prepare a milky gel of magnesium pyrophosphate. The gel was then centrifuged (at 2000 rpm for 5 minutes) and washed with deionized water. It was then dispersed in sodium phosphate buffer, pH 6.8, to prepare a slurry, and an attempt was made to pack the slurry into a column having the same standard as for the column used in Example 1. The slurry passed though the outlet filter of the column at the initial phase of packing and then gradually caused clogging in the filter until the packing pressure increased to an extraordinary point. It was after all not possible to prepare a column using the gel as a packing material. The gel was found to be in an amorphous state as a result of X-ray diffraction analysis.

EXAMPLE 2

Figure 3:
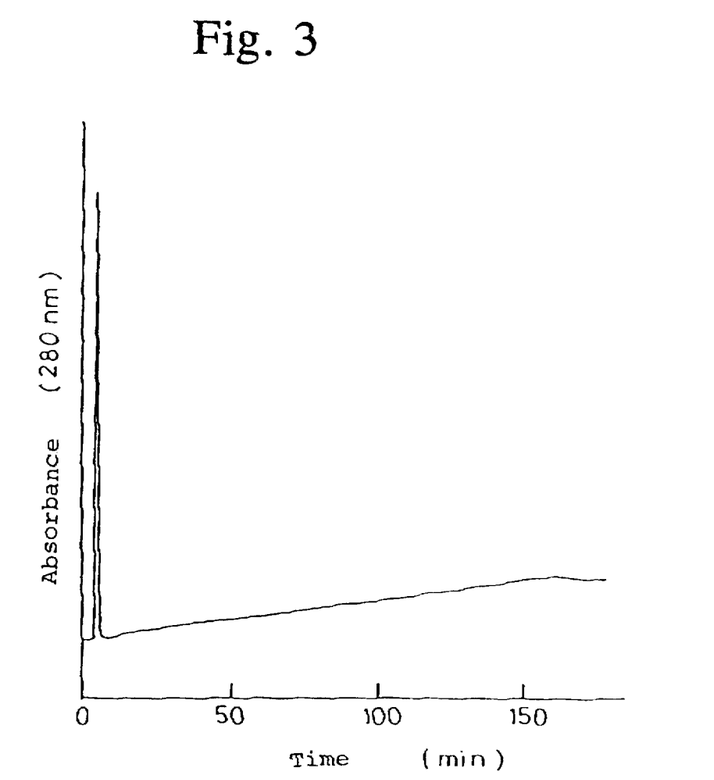
FIG. 3 shows the chromatogram of phosvitin obtained in Example 2.

0.5 mg of phosphoprotein phosvitin was injected into the same magnesium pyrophosphate column as prepared in Example 1 and the elution behavior was examined with a linear gradient of 1 mM to 1.5M (FIG. 3). The results are shown in FIG. 3. With potassium phosphate buffer the phosvitin was successfully eluted at an extremely low concentration of 10 mM or less.

COMPARATIVE EXAMPLE 3

Figure 4:
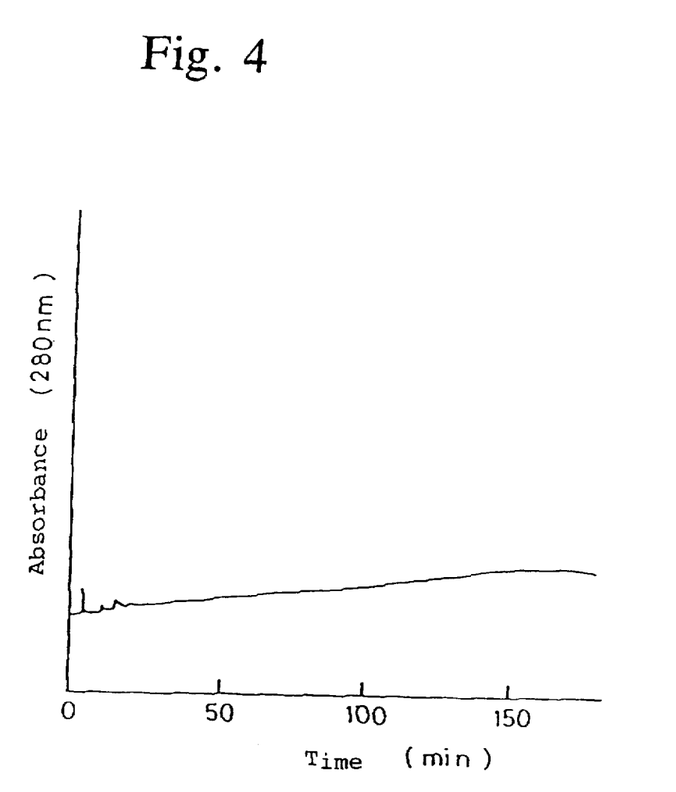
FIG. 4 shows the chromatogram of phosvitin obtained in Comparative Example 3.

Using the same hydroxyapatite column as used in Comparative Example 1, chromatography was carried out under the same conditions as in Example 2 to determine the molar concentration at which the phosvitin was eluted. The results are shown in FIG. 4. As is apparent from FIG. 4, the phosvitin did not elute even when the phosphate anion concentration in the phosphate buffer was increased to as high as 1.5M.

EXAMPLE 3

Calcium hydrogen phosphate dihydrate was pyrolyzed at 1,250° C. and 600° C. to prepare α- and γ-type calcium pyrophosphate powder, respectively. Each powder was ground and classified to a uniform particle size of 5–15 microns and then packed into a stainless steel tube. Two kinds of protein, i.e. serum albumin and transferrin, were chromatographed thereon under the same measurement conditions as in Example 1. As a result, with the α-type calcium phosphate column, neither of the two proteins flowed through it without being retained therein, while with the γ-type calcium phosphate column, both of them were retained in the column and eluted with phosphate buffer at a concentration of as low as about 20 mM.

EXAMPLE 4

Magnesium hydrogen phosphate trihydrate was pyrolyzed at 900° C. to prepare magnesium pyrophosphate powder. The powder was used to pack a column in the same manner as in Example 1. As acidic protein samples having an isoelectric point of 5.0 or less were used urease, serum albumin, ovalbumin, α-lactalbumin, fetuin and pepsin, and as basic protein samples having isoelectric points of 7.0 or more were used myoglobin, α-chymotrypsin, papain, α-chymotrypsinogen, cytochrome c and lysozyme. These samples were subjected to chromatography on the column. As a result, all the acidic protein samples tested flowed through the column without being retained therein, while all the basic protein samples were retained in the column. The fractionation of proteins into the group of acidic ones and that of basic ones was thus successfully effected.

EXAMPLE 5

Calcium hydrogen phosphate and magnesium hydrogen phosphate were dissolved in dilute nitric acid so that the calcium/magnesium atomic ratio became 1:1, and the solution was dried up at 150° C. and then pyrolyzed at 850° C. to prepare pyrophosphate with the two component metals, calcium and magnesium. The X-ray diffraction data obtained with this pyrophosphate coincided with the X-ray diffraction data for $CaMgP_2O_7$ filed in the ASTM data collection (X-ray Powder Diffraction File No. 24-135). The thus obtained powder was packed into a column, and lysozyme and cytochrome c were chromatographed thereon in the same manner as in Example 1. As a result, the properties of this column were found to be intermediate between those of calcium phosphate and magnesium phosphate columns, and the elution behavior thereof to be closer to that of magnesium phosphate columns.

EXAMPLE 6

α-Type strontium pyrophosphate powder obtained by pyrolyzing strontium hydrogen phosphate at 1,000° C. was packed into a column, and adenosine 5'-phosphate (AMP) and adenosine 5'-triphosphate (ATP) were chromatographed thereon. The AMP was found to flow through the column without being retained therein and the ATP to be weakly retained in the column.

EXAMPLE 7

An aqueous manganese acetate solution and phosphoric acid were mixed together so that the manganese/phosphorus atomic ratio became 1:1. The mixture was dried up at 150°–180° C. with stirring and the solid product was pyrolyzed at 800° C. for 4 hours. The resultant powder was confirmed by X-ray diffraction analysis to be manganese pyrophosphate. A column was packed with the powder in the same manner as in Example 1, and a mixed sample of serum albumin, lysozyme and cytochrome c was chromatographed thereon. As a result, they were found to be completely separated at the retention times of 9, 19 and 35 minutes, respectively, in the chromatogram obtained.

EXAMPLE 8

Porous titanium oxide particles having a particle size of about 100 microns were dipped in a saturated solution of magnesium hydrogen phosphate trihydrate in dilute nitric acid, and the solids were filtered off, dried and fired at 700° C. This dipping-filtering-drying-firing step cycle was repeated six times and the thus obtained product was fired at 900° C. to afford a material composed of the titanium oxide on the surface of which a magnesium pyrophosphate layer was formed. The resultant particulate material was packed into a glass tube having an internal diameter of 25 mm and a length of 100 mm, and separation of serum albumin, transferrin and γ-globulin was attempted with the result that an excellent resolution was shown as in Example 1.

EXAMPLE 9

An aqueous calcium chloride solution and an aqueous sodium pyrophosphate solution were mixed together so that the calcium/phosphorus atomic ratio became 1:1, and the mixture was allowed to stand for a whole day to form calcium diphosphate dihydrate ($Ca_2P_2O_7 \cdot 2H_2O$) crystals, which were then filtered off. The thus prepared material was packed into a column in the same manner as in Example 1, and a mixed sample of serum albumin, lysozyme and cytochrome c was chromatographed thereon. As a result the serum albumin flowed through the column without being retained therein, while the lysozyme and cytochrome c were retained therein.

EXAMPLE 10

Triethyl phosphite was added to a methanol solution of calcium nitrate so that the calcium/phosphorus atomic ratio was 1:1, whereafter aqueous ammonia was added thereto to prepare a solution having a pH of 6.5–7. Commercially available spherical apatite of the same type as described in Comparative Example 1 was dipped immediately thereafter in this solution, dried at 150° C. and pyrolyzed at 800° C. This dipping-filtering-drying-pyrolyzing operation cycle was repeated three times and the thus obtained particulate material was dipped in a saturated solution of calcium hydrogen phosphate in dilute nitric acid, filtered off, dried and then pyrolyzed at 1,000° C. The resultant particulate material was confirmed both by X-ray diffraction analysis and by scanning electron beam microscopy to be composed of apatite particles the surface of which was coated with calcium pyrophosphate. This particulate material was packed into a column in the same manner as described in Example 1 and chromatography was carried out in the same manner as described in Example 1. As in Example 1, serum albumin and transferrin flowed through the column without being retained therein and γ-globulin was retained in the column.

EXAMPLE 11

A methanol solution of calcium nitrate was mixed with phosphoric acid so that the calcium/phosphorus ratio became 1.05:1, and the mixture was spray-pyrolyzed at 1,000° C. to obtain powder of spherical material. This powdery material was found by X-ray diffraction analysis to be composed mainly of calcium pyrophosphate. Some other extremely small peaks were also observed but their intensity was too weak to identify the corresponding by-products. This powdery material was packed into a column in the same manner as in Example 1 and chromatography was carried out in the same manner as in Example 1. As a result, serum albumin and transferrin flowed through the column without being retained therein, while γ-globulin was retained in the column.

EXAMPLE 12

Phosphoric acid was added to an aqueous zirconium oxynitrate solution so that the zirconium/phosphorus atomic ratio became 1:2 and the mixture was stirred to prepare a slurry. The slurry was washed with water and then with methanol and dried at 150° C. It was then heated at 5° C./min in the atmosphere for heat treatment at 800° C. for 6 hours. The product was determined by X-ray diffraction analysis to be noncrystalline. This noncrystalline powder was packed into a column in the same manner as in Example 1 and separation of serum albumin and γ-globulin was attempted with the result that only the γ-globulin was retained in the column and hence separated from the serum albumin. Furthermore, column chromatography was performed with a mixed sample of serum albumin, lysozyme and cytochrome c in the same manner as in Example 7 to give a chromatogram which indicated a complete separation as in Example 7.

EXAMPLE 13

The dried product from the slurry prepared in Example 12 was heated at 5° C./min in the atmosphere to 1,000° C., at which heat treatment was carried out for 6 hours. The resultant powder was determined by X-ray diffraction analysis to be crystalline powder of single phase zirconium pyrophosphate. This crystalline zirconium pyrophosphate powder was packed into a column in the same manner as in Example 12, and the same chromatography as in Example 12 was performed. The separation properties for the respective proteins were the same as the results in Example 12 where noncrystalline zirconium pyrophosphate was used, although there was only a slight difference in the concentrations at which the elution took place.

EXAMPLE 14

A slurry prepared by dispersing fine magnesium dihydrogen phosphate trihydrate powder in a mixed solution of water and methanol was subjected to spray pyrolyzing at 800° C. and further to heat treatment at 500° C. for 4 hours to afford spherical magnesium metaphosphate. This product was then classified and only particles having a particle size in the range of 5–15 microns were packed into a stainless steel tube (8×100 mm). A mixed sample of serum albumin and γ-globulin was subjected to chromatography thereon at a flow rate of 1 ml/min by a linear gradient in which the phosphate anion concentration in sodium phosphate buffer, pH 6.8, was changed over a 60 minutes from 1 mM to 300 mM. As a result, only the γ-globulin was retained in the column and the serum albumin flowed through it without being retained therein. It was thus possible easily to separate the γ-globulin from the mixed sample.

COMPARATIVE EXAMPLE 4

A commercially available spherical hydroxyapatite packing material was packed into a column in the same manner as in Example 14 and chromatography was carried out thereon in the same manner as in Example 14. Both serum albumin and γ-globulin were retained and the elution peaks of the respective samples overlapped each other, meaning no complete separation.

EXAMPLE 15

Calcium dihydrogen phosphate monohydrate was pyrolyzed at 800° C. for 4 hours and the thus produced mass was ground in a ball mill and then subjected to heat treatment again at 800° C. for 4 hours to afford β-calcium metaphosphate powder. This powder was packed into a column in the same manner as in Example 14, the phosphoproteins phosvitin and α-casein were processed for elution under the same chromatographic conditions as in Example 14. Both of them were found to elute at extremely low phosphate buffer concentrations of 10 mM or less.

COMPARATIVE EXAMPLE 5

Calcium hydrogen phosphate dihydrate was pyrolyzed at 1,250° C. to afford α-calcium pyrophosphate powder. The particles were packed into a column in the same manner as in Example 15 and chromatography was carried out thereon in the same manner as in Example 15. Phosvitin did not elute with phosphate buffer even at a concentration of as high as 800 mM and α-casein required 317 mM phosphate buffer for its elution.

EXAMPLE 16

Porous titanium oxide particles having a particle size of about 200 microns were dipped in a saturated solution of magnesium dihydrogen phosphate trihydrate in dilute nitric acid, removed therefrom by filtration, dried and fired at 600° C. This dipping-filtering-drying-firing sequence was repeated six times and then fired at 800° C. to form a magnesium metaphosphate layer on the surface of the titanium oxide. The thus prepared particles were packed into a glass tube having an internal diameter of 25 mm and a length of 100 mm, and a mixed sample solution of serum albumin and γ-globulin was loaded thereonto. Only the γ-globulin was retained in the glass column and it was successfully separated from the serum albumin.

EXAMPLE 17

Aluminum hydroxide and phosphoric acid were mixed together at a molar ratio of 1:3 and the mixture was heated with stirring on a sand bath to solidify the same. The resultant solid product was subjected to heat treatment at 450° C. to afford B-type aluminum tetrametaphosphate. This product was classified and only particles having a particle size of 5–15 microns were packed into a stainless steel tube and a mixed sample of phosvitin, lysozyme and cytochrome c was subjected to chromatography in the same manner as in Example 14. As a result, the basic proteins, i.e. lysozyme and cytochrome c, were retained in the column, the lysozyme eluting at 123 mM and the cytochrome c at 211 and 229 mM. The phosphoprotein phosvitin eluted at a concentration of as low as 10 mM or less.

EXAMPLE 18

In order to obtain aluminum tetrametaphosphate showing different retention performance from that of B-type aluminum tetrametaphosphate, the aluminum tetrametaphosphate obtained in Example 17 was further subjected to heat treatment at 800° C. for 4 hours to afford A-type aluminum tetrametaphosphate. This particulate stationary phase material was packed into a column in the same manner as in Example 17, and a mixed sample of serum albumin, lysozyme and cytochrome c was chromatographed thereon. The stationary phase material had less ability to retain proteins than B-type aluminum tetrametaphosphate, so that the serum albumin flowed through the column without being retained therein, the lysozyme eluting at 83 mM and the cytochrome c at 155 and 165 mM.

EXAMPLE 19

Nickel carbonate was mixed with phosphoric acid used in 7% excess of the theoretical, and the mixture was dried up and then subjected to heat treatment at 450° C. for 2 hours. The thus obtained product was coarsely ground and then caused to react under heating at 800° C. for 4 hours to afford crystalline nickel metaphosphate powder. This powder was classified and particles having a particle size in the range of 150–300 microns were packed into a glass tube of 25 mm in internal diameter and 100 mm in length while tapping the tube to prepare a nickel metaphosphate column. The acidic proteins serum albumin, ovalbumin, fetuin and pepsin and the basic proteins α-chymotrypsin, papain, lysozyme and cytochrome c were dissolved in 1 mM sodium phosphate buffer to prepare a mixed sample. The sample was loaded onto the column for chromatography in a stepwise mode, whereby acidic proteins were successfully separated from the basic proteins.

EXAMPLE 20

Zirconium oxide was mixed with diphosphorus pentaoxide used in 5% excess of the theoretical, and the mixture was caused to react at 430° C. for 2 days to afford a product composed mainly of zirconium metaphosphate. This product was ground and particles having a particle size in the range of 150–300 microns were packed into a glass tube in the same manner as in Example 19 to prepare a zirconium metaphosphate column. With this column, acidic proteins were successfully separated from basic proteins as in Example 19.

EXAMPLE 21

Manganese carbonate was mixed with phosphoric acid used in 7% excess of the theoretical and the mixture was allowed to stand on a water bath at 80° C. to crystallize manganese dihydrogen phosphate monohydrate. The product was washed with acetone to remove excess phosphoric acid and then heated at 700° C. for 4 hours to afford manganese metaphosphate powder. When the powder was packed into a column and serum albumin and γ-globulin chromatographed thereon as in Example 14, the γ-globulin could easily be separated.

EXAMPLE 22

Zinc oxide was mixed with phosphoric acid used in 1% excess of the theoretical, and the mixture was caused to react under heating at 600° C. for 4 hours to afford a product composed mainly of zinc tetrametaphosphate. When the product was packed into a column and serum albumin and γ-globulin chromatographed thereon as in Example 14, the γ-globulin could easily be separated as in Example 21.

We claim:

1. A chromatography device comprising:

a chromatography column; and stationary phase material for chromatography comprising particles selected from the group consisting of: (1)

particles formed of metal pyrophosphate, metal metaphosphate or a combination thereof; and (2) particles having a substrate and a coating on the surface of the substrate, wherein the substrate is a solid particulate material selected from the group consisting of glass, metal, resin, metal pyrophosphate and metal metaphosphate particles and wherein the coating comprises metal pyrophosphate, metal metaphosphate or a combination thereof.

2. The chromatography device as claimed in claim 1, wherein the metal pyrophosphate or metaphosphate is that of a metal selected from the group consisting of alkaline earth metals, magnesium, iron, nickel, cobalt, manganese, copper, zinc, aluminum, zirconium and combinations thereof.

3. The chromatography device as claimed in claim 2, wherein the metal is an alkaline earth metal selected from the group consisting of calcium and strontium.

4. The chromatography device as claimed in claim 1, wherein said substrate is metal pyrophosphate particles.

5. The chromatography device as claimed in claim 1, wherein said substrate is metal metaphosphate particles.

6. The chromatography device as claimed in claim 1, wherein said stationary phase material comprises particles having a substrate and a coating on the surface of the substrate and the coating is in the form of a film or particles on a particulate substrate.

7. The chromatography device as claimed in claim 1, wherein the stationary phase material comprises particles formed of metal pyrophosphate, metal metaphosphate or a combination thereof.

8. The chromatography device as claimed in claim 1, wherein the stationary phase material comprises particles having a substrate and a coating on the surface of the substrate.

9. A chromatography device comprising:

a chromatography column; and stationary phase material for chromatography comprising particles having a substrate and a coating on the surface of the substrate, wherein the substrate comprises compacted solid particulate material selected from the group consisting of glass, metal, resin, metal pyrophosphate and metal metaphosphate particles; and the coating comprises metal pyrophosphate, metal metaphosphate, or a combination thereof.

10. The chromatography device as claimed in claim 9, wherein said solid particulate material is selected from the group consisting of metal pyrophosphate and metal metaphosphate.

11. The chromatography device as claimed in claim 9, wherein said solid particulate material is selected from the group consisting of metal pyrophosphate and metal metaphosphate particles.

12. The chromatography device according to claim 9, wherein the metal pyrophosphate or metal metaphosphate is that of a metal selected from the group consisting of alkaline earth metals, magnesium, iron, nickel, cobalt, manganese, copper, zinc, aluminum, zirconium and combinations thereof.

13. A chromatographic column comprising a length of tubing packed with a stationary phase material comprising particles having a substrate and a coating on the surface of the substrate, wherein the substrate comprises solid particulate material selected from the group consisting of glass, metal, resin, metal pyrophosphate and metal metaphosphate particles; and the coating comprises metal pyrophosphate metaphosphate, or a combination thereof.

14. The chromatographic column as claimed in claim 13, wherein said solid particulate material is selected from the group consisting of metal pyrophosphate and metal metaphosphate.

15. The chromatographic column according to claim 13, wherein the metal pyrophosphate or metal metaphosphate is that of a metal selected from the group consisting of alkaline earth metals, magnesium, iron, nickel, cobalt, manganese, copper, zinc, aluminum, zirconium and combinations thereof.

* * * * *